United States Patent
Naidu

(10) Patent No.: US 9,231,769 B1
(45) Date of Patent: Jan. 5, 2016

(54) SYSTEMS AND METHODS FOR PROVIDING INTERFACES FOR CREATING TRANSPORT LAYER SECURITY CERTIFICATES

(71) Applicant: Symantec Corporation, Mountain View, CA (US)

(72) Inventor: Navin Naidu, Bangalore (IN)

(73) Assignee: Symantec Corporation, Mountain View, CA (US)

( * ) Notice: Subject to any disclaimer, the term of this patent is extended or adjusted under 35 U.S.C. 154(b) by 124 days.

(21) Appl. No.: 13/905,102

(22) Filed: May 29, 2013

(51) Int. Cl.
*H04L 29/06* (2006.01)
*H04L 9/32* (2006.01)

(52) U.S. Cl.
CPC .......... *H04L 9/3263* (2013.01); *H04L 63/0823* (2013.01)

(58) Field of Classification Search
CPC ... H04L 9/3263; H04L 9/3247; H04L 9/3268; H04L 29/06775; H04L 63/0823; G06F 21/33
See application file for complete search history.

(56) References Cited

U.S. PATENT DOCUMENTS

| | | | |
|---|---|---|---|
| 2006/0034459 A1* | 2/2006 | Uchikawa | 380/255 |
| 2008/0172715 A1* | 7/2008 | Geiger et al. | 726/1 |
| 2012/0117608 A1* | 5/2012 | Metke et al. | 726/1 |

OTHER PUBLICATIONS

Red Hat Certificate System 8.0, Admin Guide, Edition 8.0.22, © 2009 Red Hat Inc., pp. 1-355.*

* cited by examiner

*Primary Examiner* — Eleni Shiferaw
*Assistant Examiner* — Paul Callahan
(74) *Attorney, Agent, or Firm* — ALG Intellectual Property, LLC

(57) ABSTRACT

A computer-implemented method for providing interfaces for creating transport layer security certificates may include (1) displaying a user interface for configuring a proposed digital certificate for use in a transport layer security protocol, (2) receiving user input via the user interface that specifies a certificate configuration feature for the proposed digital certificate, (3) assessing a projected impact of the certificate configuration feature on a security metric of the proposed digital certificate, and (4) presenting the projected impact of the certification configuration feature on the security metric via the user interface. Various other methods, systems, and computer-readable media are also disclosed.

20 Claims, 7 Drawing Sheets

SYSTEMS AND METHODS FOR PROVIDING INTERFACES FOR CREATING TRANSPORT LAYER SECURITY CERTIFICATES

BACKGROUND

In the digital age, individuals and organizations increasingly conduct potentially sensitive transactions via the Internet. These individuals and organizations may accordingly wish to prevent eavesdropping on and/or tampering with their Internet communications. To address this need, transport layer security protocols may facilitate secure connections between Internet-connected parties. To this end, transport layer security protocols may employ digital certificates to authenticate one party to another and to provide encryption details for establishing a secure communication session. Third-party certificate authorities may issue suitable transport layer security certificates to individuals and organizations that wish to use transport layer security protocols for secured communication.

When a user seeks to acquire a transport layer security certificate from a certificate authority (e.g., to install on a server for use in establishing trusted and secure communication between the server and client systems), the user may be unaware of the particular configuration of the transport layer certificate. After purchasing and installing the certificate, the user may learn that the certificate is inadequate for the user's needs. Accordingly, the instant disclosure identifies and addresses a need for additional and improved systems and methods for providing interfaces for creating transport layer security certificates.

SUMMARY

As will be described in greater detail below, the instant disclosure generally relates to systems and methods for providing interfaces for creating transport layer security certificates by providing a user interface through which a user may configure a proposed transport layer security certificate and which presents to the user the projected impact of the selected configuration on security (and, in some examples, on other considerations) before, e.g., the generation, purchase, and/or installation of the certificate.

In one example, a computer-implemented method for providing interfaces for creating transport layer security certificates may include (1) displaying a user interface for configuring a proposed digital certificate for use in a transport layer security protocol, (2) receiving user input via the user interface that specifies a certificate configuration feature for the proposed digital certificate, (3) assessing a projected impact of the certificate configuration feature on a security metric of the proposed digital certificate, and (4) presenting the projected impact of the certification configuration feature on the security metric via the user interface.

In one embodiment, the computer-implemented method may further include (1) receiving user input via the user interface that specifies a server configuration feature for a proposed server onto which to install the proposed digital certificate, (2) assessing a projected impact of the server configuration feature on the security metric, and (3) presenting the projected impact of the server configuration feature on the security metric via the user interface.

In one embodiment, the computer-implemented method may further include (1) assessing a projected impact of the certificate configuration feature on a performance metric of the proposed digital certificate and (2) presenting the projected impact of the certificate configuration feature on the performance metric via the user interface.

In one embodiment, the computer-implemented method may further include (1) assessing a projected impact of the certificate configuration feature on a browser compatibility metric of the proposed digital certificate and (2) presenting the project impact of the certificate configuration feature on the browser compatibility metric via the user interface.

In one embodiment, the certificate configuration feature may include an authentication standard specified by the proposed digital certificate. In this embodiment, the security metric may include a trust metric that describes a trustworthiness of the authentication standard of the proposed digital certificate.

In one embodiment, the computer-implemented method may further include (1) receiving user input via the user interface to generate the proposed digital certificate with the certificate configuration feature and (2) generating the proposed digital certificate with the certificate configuration feature.

In one embodiment, the computer-implemented method may further include suggesting, via the user interface and based at least in part on the security metric, a modification of the certificate configuration feature before generating the proposed digital certificate with the certificate configuration feature.

In one embodiment, the user interface may include a slider input element that includes a plurality of points that correspond to a plurality of certificate configuration features. In this embodiment, the plurality of points may be ordered along the slider input element according to a relative impact of each of the plurality of certificate configuration features on the security metric.

In one embodiment, a system for implementing the above-described method may include (1) a displaying module that displays a user interface for configuring a proposed digital certificate for use in a transport layer security protocol, (2) a receiving module that may receive user input via the user interface that specifies a certificate configuration feature for the proposed digital certificate, (3) an assessing module that assesses a projected impact of the certificate configuration feature on a security metric of the proposed digital certificate, (4) a presenting module that presents the projected impact of the certification configuration feature on the security metric via the user interface, and (5) at least one processor configured to execute the displaying module, the receiving module, the assessing module and the presenting module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) display a user interface for configuring a proposed digital certificate for use in a transport layer security protocol, (2) receive user input via the user interface that specifies a certificate configuration feature for the proposed digital certificate, (3) assess a projected impact of the certificate configuration feature on a security metric of the proposed digital certificate, and (4) present the projected impact of the certification configuration feature on the security metric via the user interface.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
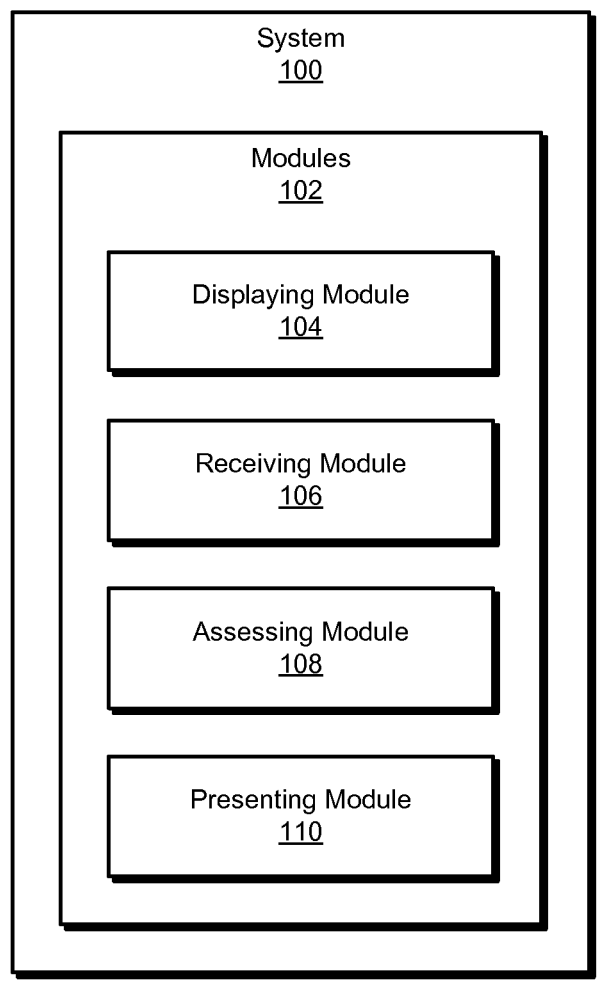
FIG. 1 is a block diagram of an exemplary system for providing interfaces for creating transport layer security certificates.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents and alternatives falling within the scope of the appended claims.

DETAILED DESCRIPTION OF EXEMPLARY EMBODIMENTS

The present disclosure is generally directed to systems and methods for providing interfaces for creating transport layer security certificates. As will be explained in greater detail below, by providing a user interface through which a user may configure a proposed transport layer security certificate and which presents to the user the projected impact of the selected configuration on security (and, in some examples, on other considerations) before, e.g., the generation, purchase, and/or installation of the certificate, the systems and methods described herein may help the user acquire an optimal transport layer security certificate for the user's needs. Furthermore, these systems and methods may potentially save the user time and/or money by avoiding the purchase and/or installation of unsuitable certificates. In some examples, these systems and methods may present a variety of security-related impacts of a certificate configuration to the user (e.g., encryption security levels, trust levels of certification standards, etc.), as well as a variety of other impacts of a certificate and/or server configuration (e.g., overall security impact on communications, performance impact on a server, a level of browser support for the configuration, etc.), thereby potentially aiding the user to optimize these disparate concerns in a unified interface before purchasing and/or installing a certificate.

Figure 2:
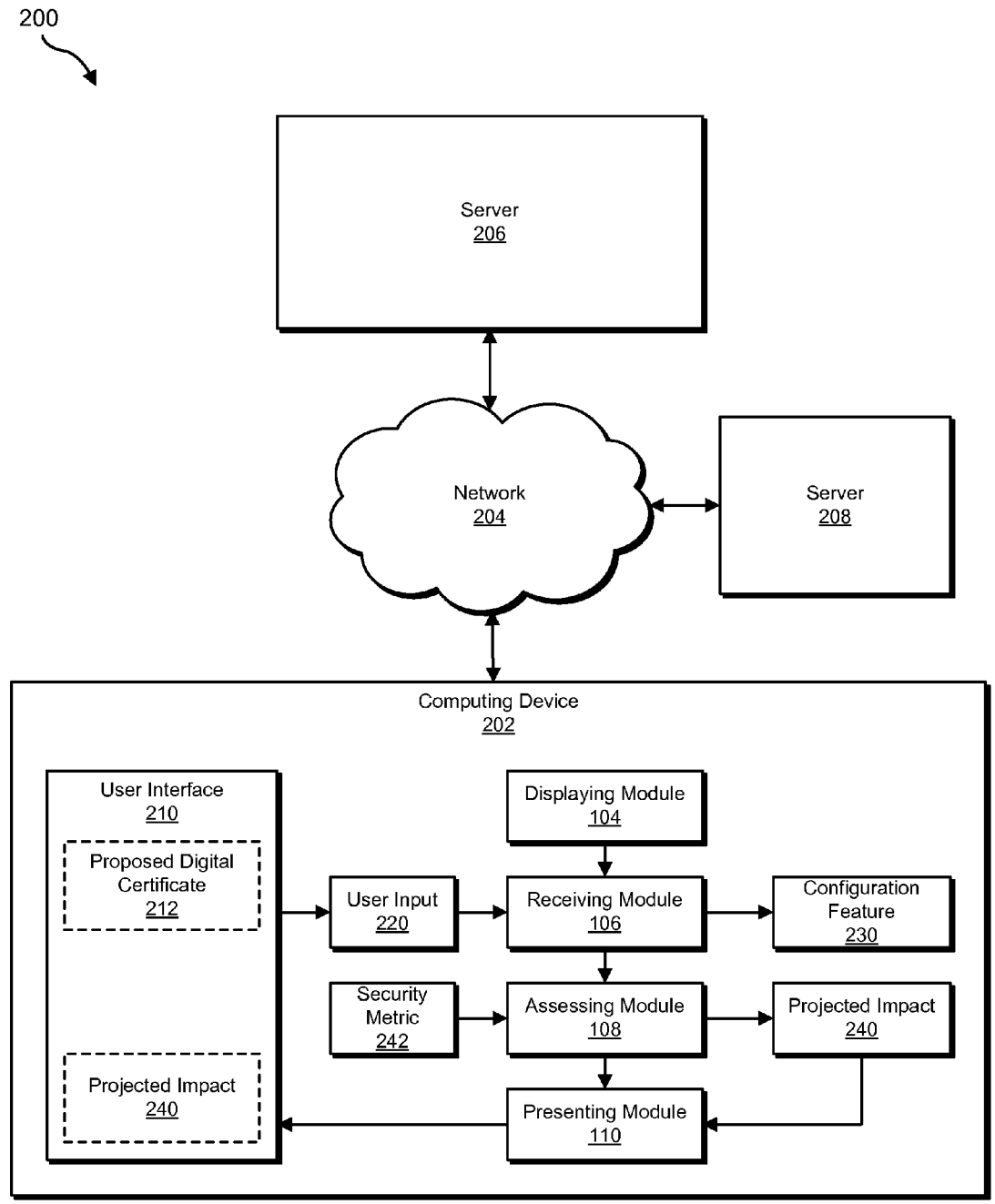
FIG. 2 is a block diagram of an exemplary system for providing interfaces for creating transport layer security certificates.

The following will provide, with reference to FIGS. 1-2, detailed descriptions of exemplary systems for providing interfaces for creating transport layer security certificates. Detailed descriptions of corresponding computer-implemented methods will also be provided in connection with FIG. 3. Detailed descriptions of exemplary user interfaces will be provided in connection with FIGS. 4-5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for providing interfaces for creating transport layer security certificates. As illustrated in this figure, exemplary system 100 may include one or more modules 102 for performing one or more tasks. For example, and as will be explained in greater detail below, exemplary system 100 may include a displaying module 104 that may display a user interface for configuring a proposed digital certificate for use in a transport layer security protocol. Exemplary system 100 may additionally include a receiving module 106 that may receive user input via the user interface that specifies a certificate configuration feature for the proposed digital certificate. Exemplary system 100 may also include an assessing module 108 that may assess a projected impact of the certificate configuration feature on a security metric of the proposed digital certificate. Exemplary system 100 may additionally include a presenting module 110 that may present the projected impact of the certification configuration feature on the security metric via the user interface. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, server 206, and/or server 208), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. Computing device 202 may be programmed with one or more of modules 102. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, facilitate computing device 202 and/or server 206 in providing interfaces for creating transport layer security certificates. In one example, server 206 may represent a server of a certificate authority that issues transport layer security certificates. In this example, computing device 202 may represent a client device in communication with server 206 to potentially acquire a digital certificate (e.g., a proposed digital certificate 212) and server 208 may represent a server onto which proposed digital certificate 212 would be installed. For example, and as will be described in greater detail below, one or more of modules 102 may cause computing device 202 and/or server 206 to provide interfaces for creating transport layer security certificates. For example, and as will be described in greater detail below, displaying module 104 may be programmed to display a user interface 210 for configuring proposed digital certificate 212 for use in a transport layer security protocol. Receiving module 106 may be programmed to receive user input 220 via user interface 210 that specifies a certificate configuration feature 230 for proposed digital certificate 212. Assessing module 108 may be programmed to assess a projected impact 240 of the certificate configuration feature 230 on a security metric 242 of proposed digital certificate 212. Presenting module 110 may be programmed to present projected impact 240 of the certification configuration feature 230 on security metric 242 via user interface 210.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Server 206 generally represents any type or form of computing device that is capable of providing a user interface, providing data for constructing a user interface, and/or issuing digital certificates. Examples of server 206 include, without limitation, application servers and database servers configured to provide various database services and/or run certain software applications. In one example, server 206 may operate as a web server that provides user interface 210 to computing device 210 in the form of a web document.

Server 208 generally represents any type or form of computing device that is capable of communicating with another computing device using a transport layer security protocol. Examples of server 208 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
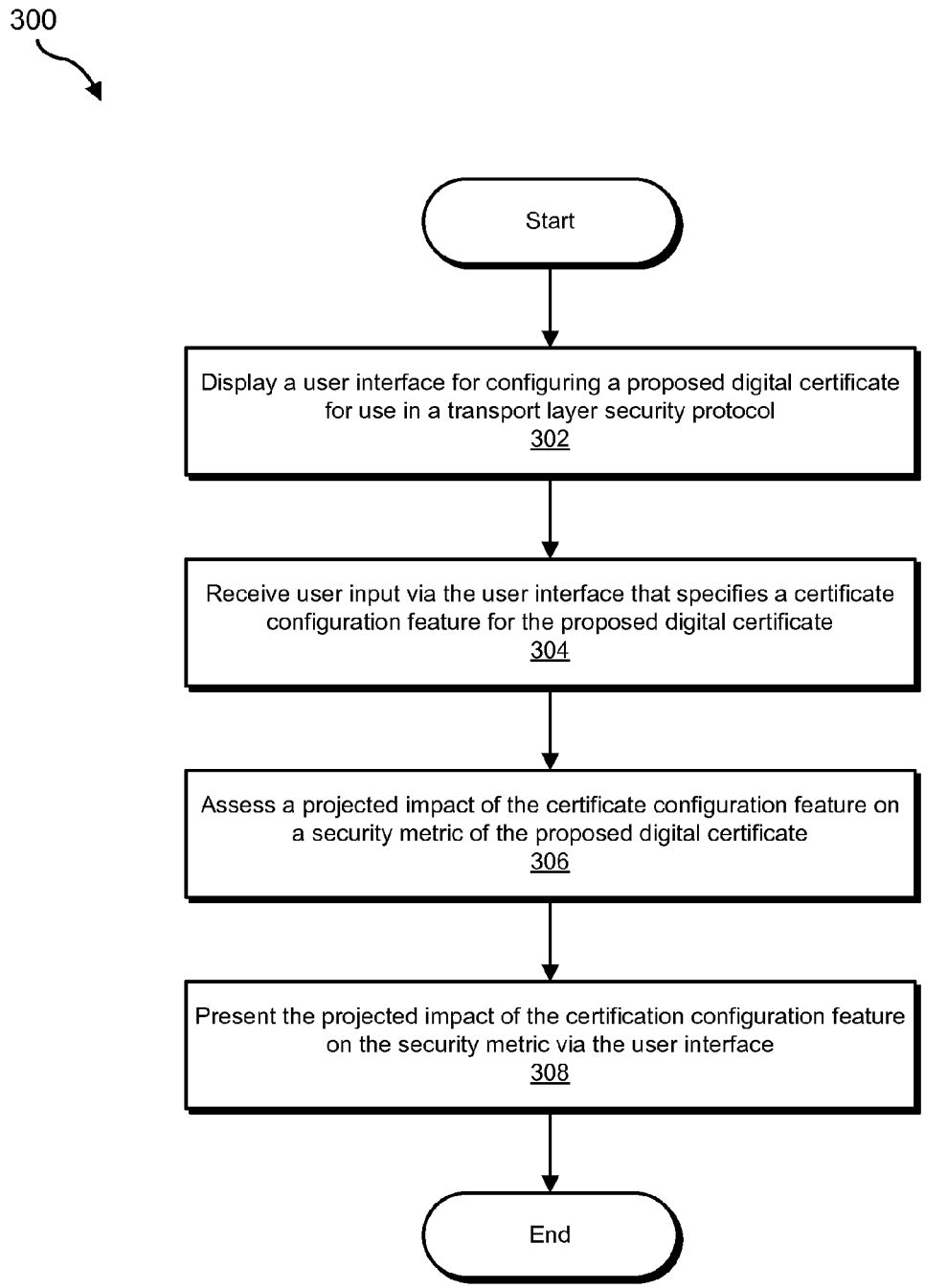
FIG. 3 is a flow diagram of an exemplary method for providing interfaces for creating transport layer security certificates.

FIG. 3 is a flow diagram of an exemplary computer-implemented method 300 for providing interfaces for creating transport layer security certificates. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may display a user interface for configuring a proposed digital certificate for use in a transport layer security protocol. For example, at step 302 displaying module 104 may, as part of computing device 202 in FIG. 2, display a user interface for configuring a proposed digital certificate 212 for use in a transport layer security protocol.

As used herein, the phrase "transport layer security protocol" may refer to any protocol for establishing secure communication over a network. In some examples, a transport layer security protocol may use one or more methods of authentication and/or encryption to make eavesdropping on and/or tampering with Internet communications more difficult. In some examples, a transport layer security protocol may establish a secure session over a network (e.g., at the session layer of a network). In these examples, the transport layer security protocol may then establish encryption parameters and encrypt communications (e.g., at a presentation layer of the network). The transport layer security protocol may thereby provide security for the transport layer of the network. Examples of transport layer security protocols include, without limitation, Secure Sockets Layer (SSL) versions 2.0 and 3.0 and Transport Layer Security (TLS) versions 1.0, 1.1, and 1.2.

As used herein, the phrase "digital certificate" may refer to any identity certificate and/or public key certificate that may be used in an implementation of a transport layer security protocol. For example, the phrase "digital certificate" may refer to a digitally signed document that binds an identity with a public encryption key (e.g., to verify that the public encryption key belongs to a party identified by the digital certificate). In some examples, a digital certificate may be issued by a certificate authority. For example, a certificate authority may digitally sign a digital certificate with a private key controlled by the certificate authority and publish a public key of a user to which the digital certificate is issued. As an example, the digital certificate may include an X.509 certificate. Accordingly, as used herein, the phrase "proposed digital certificate" may refer to a configuration of a potential digital certificate that has yet to be generated, purchased, and/or installed.

As used herein, the phrase "user interface" may refer to any interface that may allow a user to interact with a computing system. In some examples, the user interface may include a web page with one or more input elements. Additionally or alternatively, the user interface may operate as a part of a stand-alone application.

Accordingly, displaying module 104 may display the user interface in any suitable manner. For example, displaying module 104 may include one or more web page specifications, scripts, and/or instructions for displaying one or more interface elements. In this example, displaying module 104 may display the user interface by being executed by and/or rendered within a web browser. Additionally or alternatively, displaying module 104 may include an instruction to transmit one or more interface elements to a client system. In this example, displaying module 104 may display the user interface by transmitting the user interface elements to an endpoint that displays (and, e.g., receives input from) the interface elements. In some examples, displaying module 104 may display the user interface by operating as a part of a web browser (e.g., a browser plug-in) and/or an executable and/or interpreted document within a web browser.

In some examples, the user interface may include an interface element for entering a password (e.g., a text box). Additionally or alternatively, as will be explained in greater detail below, the user interface may include one or more colors for selecting and/or applying to the password (e.g., before and/or after entering one or more characters of the password via the user interface). In some examples, the user interface may include a web page. For example, the web page may include a web form (e.g., to enter a user name and/or password) and/or one or more interface elements for selecting colors. In some examples, the web page may include a script for applying selected colors to the password within the user interface, for recording selected colors for the password, and/or for generating a secure password from the password and the selected colors.

As will be described in greater detail below, in some examples, the user interface may include a slider element for receiving input that specifies a certificate configuration feature for the proposed digital certificate. In some examples, the slider input element may include a plurality of points that correspond to a plurality of certificate configuration features. In these examples, the plurality of points may be ordered along the slider input element according to a relative impact of each of the plurality of certificate configuration features on the security metric. For example, as will be described in greater detail below, moving a slider of the slider input element toward the left may select increasingly insecure parameters, while moving the slider of the slider input element toward the right may select increasingly secure parameters.

Figure 4:
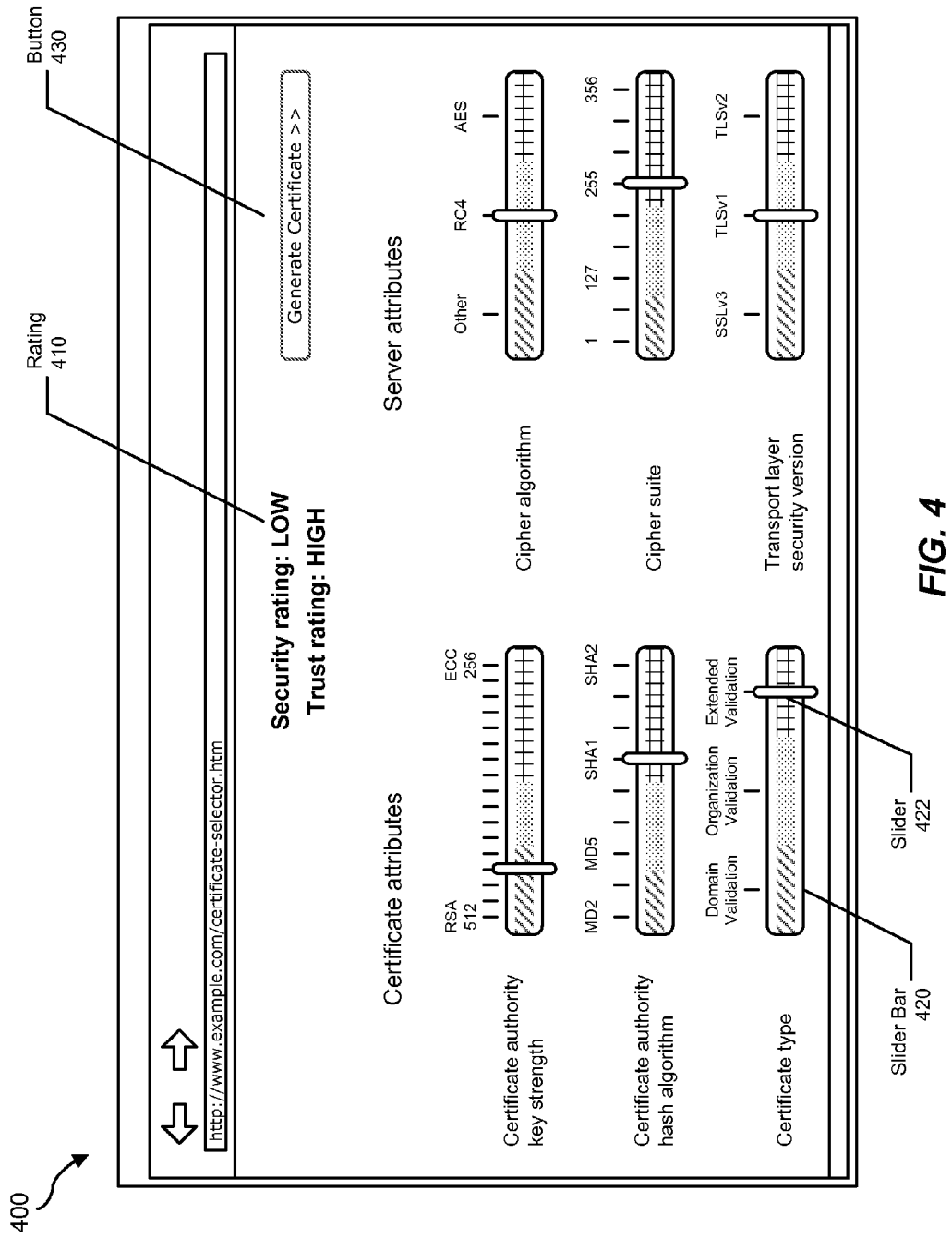
FIG. 4 is an illustration of an exemplary interface for creating transport layer security certificates.

FIG. 4 illustrates an exemplary user interface 400. As shown in FIG. 4, exemplary user interface 400 may be presented within a web browser. User interface 400 may include a slider input element for each of several attributes of a proposed digital certificate and a proposed server onto which to install the digital certificate. For example, user interface may include a slider input element for the type of digital certificate (e.g., according to a verification method employed by a certificate authority). The slider input element may include a slider bar 420 and a slider 422. As shown in FIG. 4, slider bar 420 may include a series of different colors, shadings, and/or visual patterns. For example, the left end of slider bar 420 may be colored red to indicate that options on the left end of slider bar 420 are insecure options (e.g., would lead to and/or tend to lead to insecure outcomes if selected). Likewise, the center of slider bar 420 may be colored yellow to indicate that options in the center of slider bar 420 are moderately secure options and the right side of slider bar 420 may be colored red to indicate that options in the center of slider bar 420 are secure options.

As shown in FIG. 4, user interface 400 may also include a rating 410 (e.g., indicating that the proposed digital certificate according to the current configuration has a security rating of "LOW" and a trust rating of "HIGH."). User interface 400 may also include a button 430 to submit the proposed digital certificate according to the current configuration for purchase, generation, and/or installation.

Figure 5:
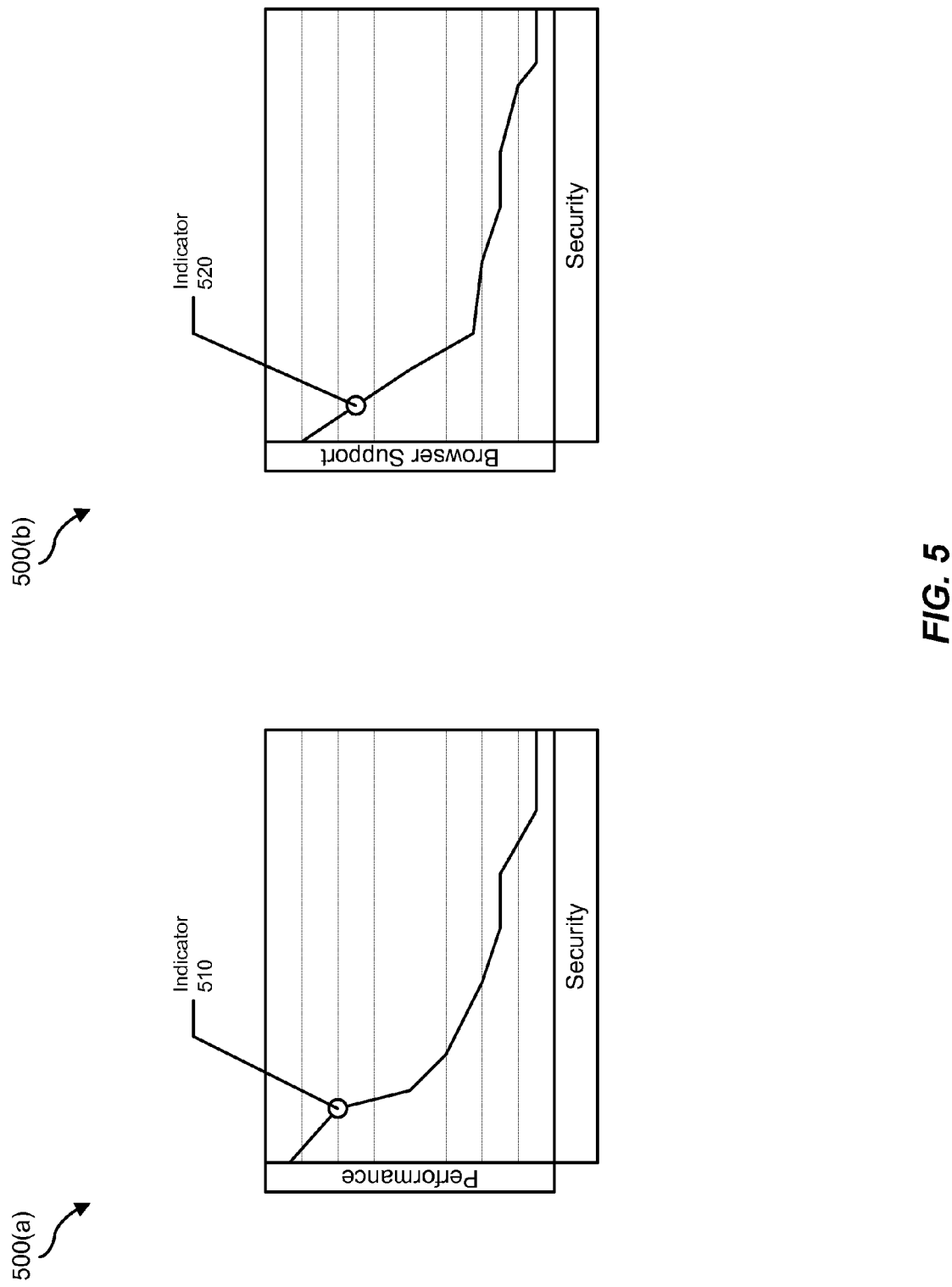
FIG. 5 is an illustration of an exemplary interface for creating transport layer security certificates.

FIG. 5 illustrates additional exemplary user interface elements 500(a) and 500(b). As shown in FIG. 5, user interface element 500(a) may include a graph that plots the security impact of a proposed digital certificate against a performance impact of the proposed digital certificate, where an indicator 510 represents a current configuration of the proposed digital certificate. Likewise, user interface 500(b) may include a graph that plots the security impact of a proposed digital certificate against an impact on browser support levels of the proposed digital certificate, where an indicator 520 represents a current configuration of the proposed digital certificate.

Returning to FIG. 3, at step 304 one or more of the systems described herein may receive user input via the user interface that specifies a certificate configuration feature for the proposed digital certificate. For example, at step 304 receiving module 106 may, as part of computing device 202 in FIG. 2, receive user input 220 via the user interface that specifies a certificate configuration feature 230 for proposed digital certificate 212.

As used herein, the phrase "certificate configuration feature" may refer to any feature and/or attribute of a digital certificate and/or proposed digital certificate. For example, the certificate configuration feature may include a certificate authority key strength used to sign the digital certificate. Examples of the certificate authority key strength include, without limitation, "RSA 512" and "ECC 256." In another example, the certificate configuration feature may include a certificate authority hash algorithm used to sign the digital certificate. Examples of the certificate authority hash algorithm include, without limitation, "MD2," "MD5," "SHA1," and "SHA2." In some examples, the certificate configuration feature may include an authentication standard specified by the proposed digital certificate. Examples of authentication standards include, without limitation, domain validation (e.g., verifying that an owner of the digital certificate also controls a specified Internet domain), organizational validation (e.g., domain validation plus one or more additional vetting processes performed by a certificate authority of an organization that owns the digital certificate), and extended validation (e.g., requiring an audit of an organization that owns the digital certificate to establish the identify and presence of the organization, to establish exclusive control over a domain, and the authority of one or more parties acting on behalf of the owner of the domain).

Receiving module 106 may receive the user input in any suitable manner. For example, receiving module 106 may include one or more web page specifications, scripts, and/or instructions for presenting one or more interface elements. In this example, receiving module 106 may receive the user input by being executed by and/or rendered within a web browser. Additionally or alternatively, receiving module 106 may include one or more instructions to receive user input entered on a client system. In this example, receiving module 106 may receive the user input by receiving the result of the manipulation of user interface elements from an endpoint that displays (and, e.g., receives input from) the interface elements. In some examples, receiving module 106 may receive the user input by operating as a part of a web browser (e.g., a browser plug-in) and/or an executable and/or interpreted document within a web browser.

In some examples, receiving module 106 may receive user input via the user interface that specifies a server configuration feature for a proposed server onto which to install the proposed digital certificate. As used herein, the phrase "server configuration feature" may refer to any feature and/or attribute of a server and/or a proposed server that may impact, in concert with a digital certificate configuration, the security, performance, compatibility, and/or other consideration of the implementation of a transport layer security protocol using the digital certificate. For example, the server configuration feature may include a cipher algorithm used to encrypt messages. Examples of cipher algorithms include, without limitation, "RC4" and "AES." As another example, the server configuration feature may include a cipher suite used by the server to negotiate transport layer security settings. Examples of cipher suits include, without limitation, "1," "127," "255," and "356." As an additional example, the server configuration feature may include a transport layer security protocol type and/or version implemented by the server. Examples of transport layer security protocols include "SSLv3," "TLSv1," and "TLSv2."

Using FIG. 4 as an example, receiving module 106 may receive user input via user interface 400 that specifies a cipher algorithm for use by a server onto which a user intends to install the proposed digital certificate. In this example, receiving module 106 may receive user input via the "cipher algorithm" slider element to set the cipher algorithm of the proposed server to "RC4." In this manner, as will be described in greater detail below, the user may see the impact of the digital certificate configuration in light of a server configuration feature before purchasing, generating, and/or installing the digital certificate.

Using FIG. 5 as an example, in some examples receiving module 106 may receive user input via user interface element 500(a). For example, a user may drag indicator 510 along the graph to select a preferred combination of performance and security. In this example, receiving module 106 may then update the slider input elements of user interface 400 in FIG. 4 to reflect a configuration that achieves the preferred combination. Likewise, a user may drag indicator 520 along the graph of user interface element 500(b) to select a preferred combination of browser compatibility and security.

Returning to FIG. 3, at step 306 one or more of the systems described herein may assess a projected impact of the certificate configuration feature on a security metric of the proposed digital certificate. For example, at step 306 assessing module 108 may, as part of computing device 202 in FIG. 2, assess a projected impact 240 of the certificate configuration feature 230 on a security metric of proposed digital certificate 212.

As used herein, the phrase "security metric" may refer to any scoring system, rating system, and/or set of rules for evaluating the impact of a digital certificate configuration on one or more security considerations. In some examples, the security metric may relate to (and assessing module 108 may draw from) from one or more empirical data sources that identify the impact of one or more certificate configuration features, alone or in combination, on security. Additionally or alternatively, the security metric may relate to (and assessing module 108 may draw from) one or more scores, ratings, and/or rules specified by one or more security vendors and/or experts. In some examples, the security metric may relate to (and assessing module 108 may draw from) one or more known security and/or computational properties of keys, algorithms, and/or certificate verification methods indicated by certificates. In some examples, the security metric may include a trust metric that describes a trustworthiness of an authentication standard of a proposed digital certificate.

Assessing module 108 may assess the projected impact of the certificate configuration feature on the security metric in any suitable manner. For example, assessing module 108 may generate a rating and/or score that accounts for the certification configuration feature based on the security metric. In some examples, assessing module 108 may determine a change to a rating and/or score that accounts for a change in the certification configuration feature based on the security metric.

In some examples, assessing module 108 may assess the projected impact of the certificate configuration feature on one or more additional metrics. For example, assessing module 108 may assess the projected impact of the certificate configuration feature on a performance metric of the proposed digital certificate. For example, assessing module 108 may project the computing resource consumption entailed by the selected certificate configuration feature (e.g., a cipher algorithm that consumes more computing resources). In another example, assessing module 108 may assess the projected impact of the certificate configuration feature on a browser compatibility metric of the proposed digital certificate. For example, assessing module 108 may project that a certain percentage of client systems (e.g., in terms of number and/or percentages) may be incompatible with the selected certificate configuration feature.

In some examples, assessing module 108 may assess the projected impact of a server configuration feature on the security metric. Likewise, assessing module 108 may assess the projected impact of the server configuration feature on a performance metric and/or a browser compatibility metric. In some examples, assessing module 108 may assess the projected impact of the server configuration feature on one or more of the metrics discussed above in combination with one or more certificate configuration features. In this manner, as will be explained in greater detail below, assessing module 108 may assist a user to select a digital certificate best suited for the target server and the goals of the user.

At step 308, one or more of the systems described herein may present the projected impact of the certification configuration feature on the security metric via the user interface. For example, at step 308 presenting module 110 may, as part of computing device 202 in FIG. 2, present projected impact 240 of the certification configuration feature 230 on the security metric via the user interface.

Presenting module 110 may present the projected impact in any suitable manner. For example, presenting module 110 may include one or more web page specifications, scripts, and/or instructions for displaying one or more interface elements. In this example, presenting module 110 may present the projected impact by being executed by and/or rendered within a web browser. Additionally or alternatively, presenting module 110 may include an instruction to transmit one or more interface elements to a client system. In this example, presenting module 110 may present the projected impact by transmitting the user interface elements to an endpoint that displays the interface elements. In some examples, presenting module 110 may present the projected impact by operating as a part of a web browser (e.g., a browser plug-in) and/or an executable and/or interpreted document within a web browser.

In some examples, presenting module 110 may present the project impact dynamically as receiving module 106 receives user input. For example, presenting module 110 may update the user interface with a security rating reflecting a user's certificate parameter selections as the user makes the selections (e.g., without the user first submitting the proposed certificate for evaluation, purchase, generation, and/or installation).

As explained above, in some examples one or more of the systems described herein (e.g., assessing module 108) may assess the projected impact of one or more certificate configuration features and/or one or more server configuration features. Accordingly, presenting module 110 may present, via the user interface, the projected impact of the certificate configuration feature and/or a server configuration feature on the security metric, on a performance metric, and/or on a browser compatibility metric. As mentioned earlier, in some examples the projected impact may include a composite rating accounting for multiple certificate configuration features and server configuration features and/or a particular combination of certificate configuration features and server configuration features.

Using FIG. 4 as an example, assessing module 108 may have assessed a security rating and a trust rating based on the configuration of the six slider interface elements in user interface 400. Accordingly, presenting module 110 may update rating 410 within user interface 400 to show the assessed security and trust ratings (e.g., that the security rating is "low" and that the trust rating is "high" based on the particular configuration entered in user interface 400).

Using FIG. 5 as an example, presenting module 110 may update user interface element 500(a) to show a current balance of performance and security by placing indicator 510 to represent the projected performance and security outcome of the current proposed configuration of the digital certificate (and, e.g., the proposed server). Likewise, presenting module 110 may update user interface element 500(b) to show a current balance of browser support and security by placing indicator 520 to represent the projected browser support and security outcome of the current proposed configuration.

In some examples, one or more of the systems described herein may also receive user input via the user interface to generate the proposed digital certificate with the certificate configuration feature. Accordingly, these systems may generate the proposed digital certificate with the certificate configuration feature (e.g., by issuing a command to a certificate authority server to generate the digital certificate). Additionally or alternatively, these systems may receive user input to purchase and/or install the proposed digital certificate. Using FIG. 4 as an example, a generation module may receive user input via button 430 to generate the proposed digital certificate and then generate the proposed digital certificate.

In some examples, one or more of the systems described herein may use the user interface and based at least in part on the security metric, a modification of the certificate configuration feature before generating the proposed digital certificate with the certificate configuration feature. For example, a suggestion module may determine that the proposed digital certificate with the certificate configuration feature provides insufficient security and/or a poor balance of security, performance, and/or compatibility. In these examples, these systems may prevent a user from inadvertently generating, purchasing, and/or installing an unsuitable digital certificate.

As explained above in connection with method 300 in FIG. 3, when generating a Certificate Signing Request (CSR), a user may be asked to choose various CSR parameters that may be used to generate an SSL certificate. The user may not have a clear understanding about how certificate parameters will impact the security and performance of a server on which the certificate is installed. A user who purchases and/or installs an SSL certificate without first understanding the consequences may be frustrated, having wasted time and money on unsatisfactory certificates. Furthermore, SSL certificates with different parameters that affect security may also affect the performance of the server on which it is installed—and may affect the performance of different servers differently. A user would ideally understand the full impact of all parameter choices for an SSL certificate that the user faces before actually purchasing, generating, and/or installing the SSL certificate.

Accordingly, the systems described herein may present information about the impact of certificate parameter choices on the security and/or performance of a server. For example, these systems may indicate the security of a server and/or how to improve the security of the server with certificate parameter choices, the performance of a server and/or how to improve the performance of the server with certificate parameter choices, and/or how changing one certificate parameter will impact the security, performance, and/or other factors of the user's server.

In this manner, these systems may help SSL certificate customers to generate and analyze the rating of an SSL certificate dynamically even before the certificate is installed on the server. This may help the customer to understand the security and trust features of the SSL certificate the user is planning to install and to make a more informed decision about choosing the certificate parameter while generating and submitting a CSR. The user can also modify the server parameters dynamically to understand how they may impact the security of the server.

In some examples, these systems may provide an online tool that is used to analyze the SSL certificate rating and may be integrated with the user interface. The input to the online tool may include certificate parameters for a digital certificate (e.g., an X.509 certificate). Based on a scoring engine, the tool may compute the SSL certificate rating. For example, the scoring engine may provide estimates of security and performance based on empirical data regarding various certificate parameters in combination with server attributes and/or based on known security and computational properties of keys, algorithms, and/or certificate verification methods indicated by certificates.

These systems may provide the list of X.509 certificate parameters along with a slide that may be used to change the parameter value. As the slider is moved for any parameter, these systems may send a request to a back-end with the list of parameters.

In some examples, the user interface may include two modal displays: one for certificate attributes and one for server attributes. Each modal may include a slider for each attribute in a range from "weak" (represented by red) to "strong" (represented by green). A customer may move the slider to change the attribute and to see how it will reflect the overall security score and trust score.

For example, a certificate with organization validation may show a lower trust score than a certification with extended validation. Accordingly, "extended validation" may present within the green range of the slider of the "certificate type" attribute in the interface. Accordingly, using the slider, the customer may tweak different attributes (of both certificate and server) and analyze its impact on the overall security and trust score.

This tool may also help customers understand how changing all the slider values to a "high security" setting will impact the performance of the server or how moving all the slider values to a "low security" setting will impact the security of the server. This may help customers to take a more informed decision about which SSL certificate to purchase for a given server configuration.

Figure 6:
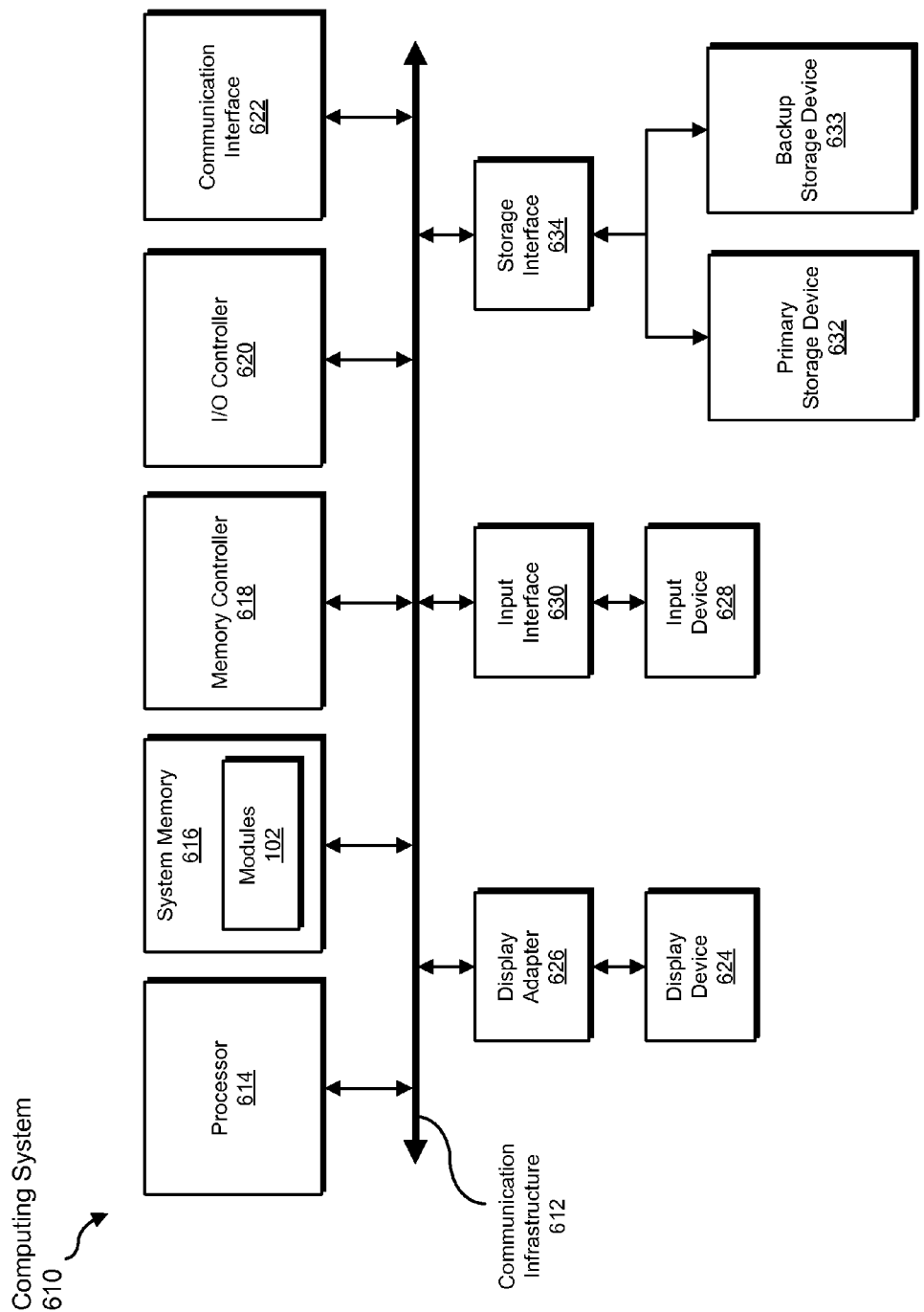
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
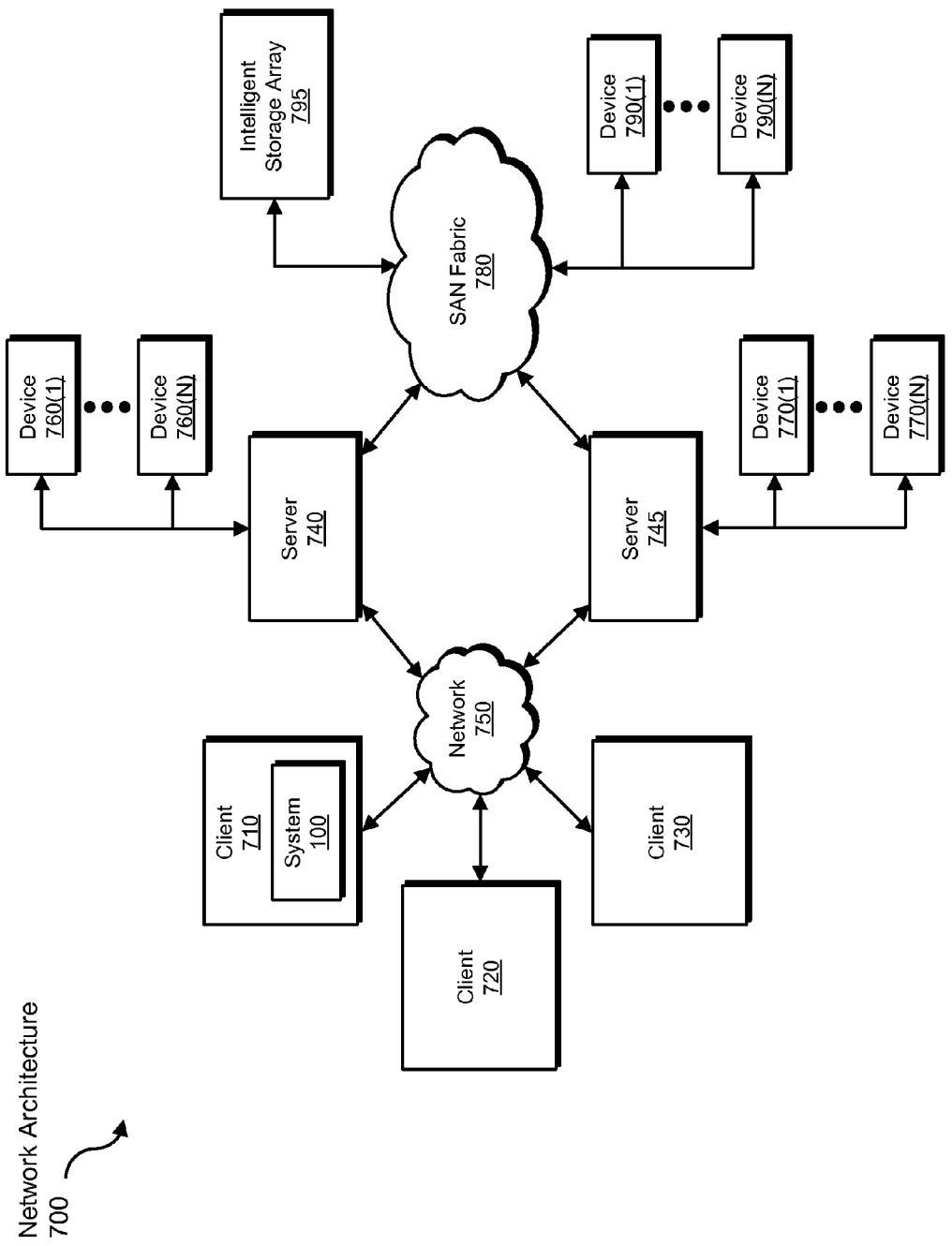
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for providing interfaces for creating transport layer security certificates.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive user input to be transformed, transform the user input by calculating a security impact of a configuration reflected by the user input, output a result of the transformation to a user interface, user the result of the transformation to facilitate the purchase and/or generation of a digital certificate, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for providing interfaces for creating transport layer security certificates, at least a portion of the method being performed by a computing device comprising at least one processor, the method comprising:
   displaying a user interface for configuring a proposed digital certificate for use in a transport layer security protocol;
   receiving user input via the user interface that specifies a certificate configuration feature for the proposed digital certificate;
   assessing a projected impact of the certificate configuration feature on a security metric of the proposed digital certificate;
   presenting the projected impact of the certification configuration feature on the security metric via the user interface by dynamically updating the user interface with the projected impact of the certification configuration feature in response to receiving the user input.

2. The computer-implemented method of claim 1, further comprising:
   receiving user input via the user interface that specifies a server configuration feature for a proposed server onto which to install the proposed digital certificate;
   assessing a projected impact of the server configuration feature on the security metric;
   presenting the projected impact of the server configuration feature on the security metric via the user interface.

3. The computer-implemented method of claim 1, further comprising:
   assessing a projected impact of the certificate configuration feature on a performance metric of the proposed digital certificate;
   presenting the projected impact of the certificate configuration feature on the performance metric via the user interface.

4. The computer-implemented method of claim 1, further comprising:
   assessing a projected impact of the certificate configuration feature on a browser compatibility metric of the proposed digital certificate;
   presenting the projected impact of the certificate configuration feature on the browser compatibility metric via the user interface.

5. The computer-implemented method of claim 1, wherein:
   the certificate configuration feature comprises an authentication standard specified by the proposed digital certificate;
   the security metric comprises a trust metric that describes a trustworthiness of the authentication standard of the proposed digital certificate.

6. The computer-implemented method of claim 1, further comprising:
   receiving user input via the user interface to generate the proposed digital certificate with the certificate configuration feature;
   generating the proposed digital certificate with the certificate configuration feature after presenting the projected impact of the certification configuration feature on the security metric via the user interface by dynamically updating the user interface with the projected impact of the certification configuration feature.

7. The computer-implemented method of claim 1, further comprising suggesting, via the user interface and based at least in part on the security metric, a modification of the certificate configuration feature before generating the proposed digital certificate with the certificate configuration feature.

8. The computer-implemented method of claim 1, wherein the user interface comprises a slider input element that comprises a plurality of points that correspond to a plurality of certificate configuration features, the plurality of points being ordered along the slider input element according to a relative impact of each of the plurality of certificate configuration features on the security metric.

9. A system for providing interfaces for creating transport layer security certificates, the system comprising:
   a displaying module comprising logic configured to display a user interface for configuring a proposed digital certificate for use in a transport layer security protocol;
   a receiving module comprising logic configured to receive user input via the user interface that specifies a certificate configuration feature for the proposed digital certificate;
   an assessing module comprising logic configured to assess a projected impact of the certificate configuration feature on a security metric of the proposed digital certificate;
   a presenting module comprising logic configured to present the projected impact of the certification configuration feature on the security metric via the user interface by dynamically updating the user interface with the projected impact of the certification configuration feature in response to receiving the user input;
   at least one processor implemented at least partially in hardware and configured to execute the displaying module, the receiving module, the assessing module, and the presenting module.

10. The system of claim 9, wherein:
    the receiving module receives user input via the user interface that specifies a server configuration feature for a proposed server onto which to install the proposed digital certificate;
    the assessing module assesses a projected impact of the server configuration feature on the security metric;
    the presenting module presents the projected impact of the server configuration feature on the security metric via the user interface.

11. The system of claim 9, wherein:
    the assessing module assesses a projected impact of the certificate configuration feature on a performance metric of the proposed digital certificate;
    the presenting module presents the projected impact of the certificate configuration feature on the performance metric via the user interface.

12. The system of claim 9, wherein:
    the assessing module assesses a projected impact of the certificate configuration feature on a browser compatibility metric of the proposed digital certificate;

the presenting module presents the projected impact of the certificate configuration feature on the browser compatibility metric via the user interface.

13. The system of claim 9, wherein:
the certificate configuration feature comprises an authentication standard specified by the proposed digital certificate;
the security metric comprises a trust metric that describes a trustworthiness of the authentication standard of the proposed digital certificate.

14. The system of claim 9, further comprising a generation module comprising logic configured to:
receive user input via the user interface to generate the proposed digital certificate with the certificate configuration feature;
generate the proposed digital certificate with the certificate configuration feature after presenting the projected impact of the certification configuration feature on the security metric via the user interface by dynamically updating the user interface with the projected impact of the certification configuration feature.

15. The system of claim 9, further comprising a suggestion module comprising logic configured to suggest, via the user interface and based at least in part on the security metric, a modification of the certificate configuration feature before generating the proposed digital certificate with the certificate configuration feature.

16. The system of claim 9, wherein the user interface comprises a slider input element that comprises a plurality of points that correspond to a plurality of certificate configuration features, the plurality of points being ordered along the slider input element according to a relative impact of each of the plurality of certificate configuration features on the security metric.

17. A non-transitory computer-readable-storage medium comprising one or more computer-readable instructions that, when executed by at least one processor of a computing device, cause the computing device to:
display a user interface for configuring a proposed digital certificate for use in a transport layer security protocol;
receive user input via the user interface that specifies a certificate configuration feature for the proposed digital certificate;
assess a projected impact of the certificate configuration feature on a security metric of the proposed digital certificate;
present the projected impact of the certification configuration feature on the security metric via the user interface by dynamically updating the user interface with the projected impact of the certification configuration feature in response to receiving the user input.

18. The computer-implemented method of claim 1, wherein the certificate configuration feature comprises at least one of:
a certificate authority key strength used to sign the digital certificate;
a certificate authority hash algorithm used to sign the digital certificate;
an authentication standard specified by the proposed digital certificate, wherein the authentication standard is selected from a plurality of potential authentication standards that comprise at least one of:
domain validation;
organizational validation;
extended validation.

19. The computer-implemented method of claim 1, wherein assessing the projected impact of the certificate configuration feature further comprises assessing the projected impact of the certificate configuration feature on a browser compatibility metric.

20. The computer-implemented method of claim 1, wherein presenting the projected impact of the certification configuration feature on the security metric via the user interface comprises presenting, via the user interface, at least one of:
a balance of a projected security impact and a projected performance impact of the certificate configuration feature on the proposed digital certificate;
a balance of a projected security impact and a projected compatibility impact of the proposed digital certificate in light of the certificate configuration feature.

* * * * *